United States Patent [19]
Sakaguchi

[11] Patent Number: 5,912,724
[45] Date of Patent: Jun. 15, 1999

[54] ILLUMINANCE SETTING METHOD

[75] Inventor: Yasunobu Sakaguchi, Kanagawa, Japan

[73] Assignee: Fuji Photo Film Co., Ltd., Kanagawa, Japan

[21] Appl. No.: 08/861,729

[22] Filed: May 22, 1997

[30] Foreign Application Priority Data

May 22, 1996 [JP] Japan ..................................... 8-127060

[51] Int. Cl.$^6$ .............................. G03B 27/72; H04N 1/40
[52] U.S. Cl. ................................ 355/35; 355/38; 355/68; 355/71
[58] Field of Search ................................. 355/32, 35, 38, 355/68, 71, 75; 358/401, 487, 527; 348/96, 97, 98, 110, 112

[56] References Cited

U.S. PATENT DOCUMENTS 5,438,389 8/1995 Kito et al. .................................. 355/38

FOREIGN PATENT DOCUMENTS 6217091 8/1994 Japan .
6233052 8/1994 Japan .
6245062 9/1994 Japan .

Primary Examiner—Alan A. Mathews

[57] ABSTRACT

According to the improve method for use with image inputting apparatus to set the illuminance of reading light, the measurement with the image sensor is performed with the light source stop being adjusted to a specified initial value of degree of opening in the absence of original in an optical path and if an output from the image sensor is not within a specified range, either adjustment of the quantity of the light from the source or readjustment of the light source stop using a light source stop table which represents the relationship between the degree of opening of the light source stop and the output of the image sensor or both the adjustment of the quantity of the light from the source and the readjustment of the light source stop are performed and another measurement with the image sensor is performed in the absence of original in the optical path and these steps are repeated until the output from the image sensor comes to fall within the specified range, and if the output falls within the specified range, the corresponding quantity of the light from the source and the corresponding degree of opening of the light source stop are set as values representing the reference state of the light source for the image reading mode. The setting of the illuminance for setting the basic quantity of image reading light in the image reading apparatus can be accomplished easily and with high efficiency.

3 Claims, 7 Drawing Sheets

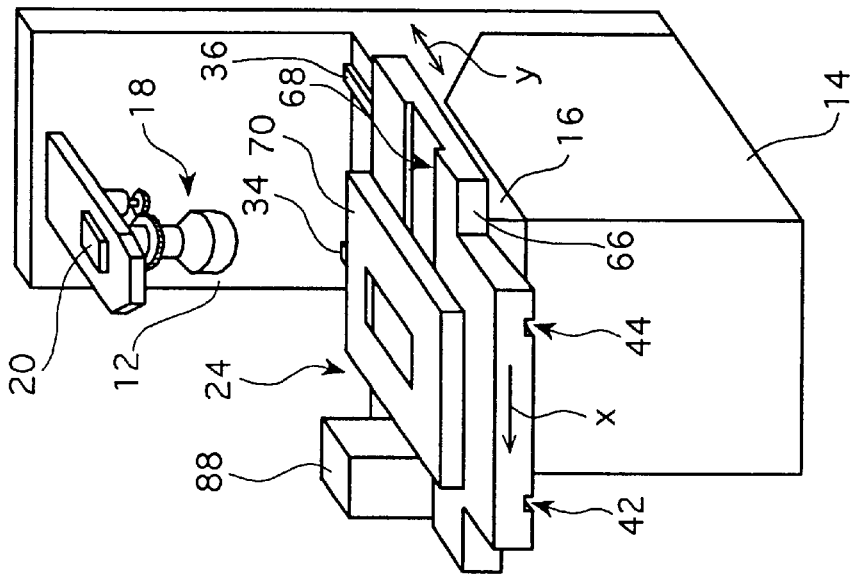
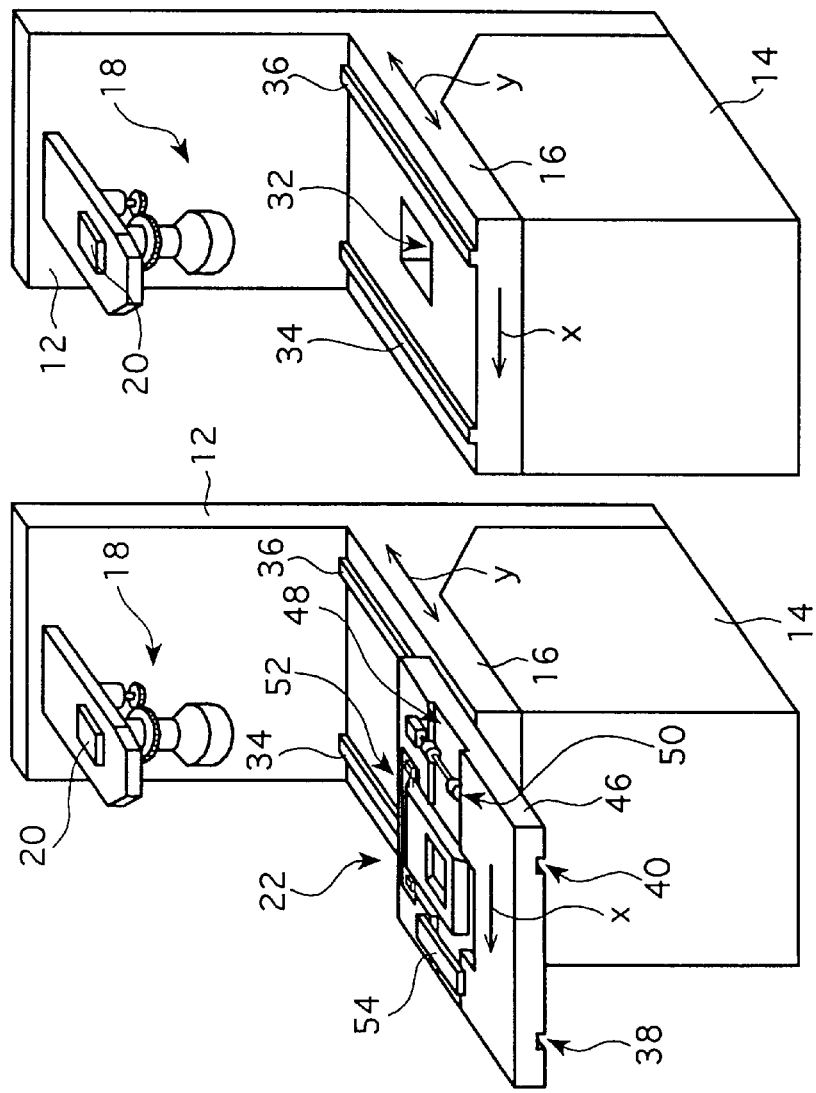

ILLUMINANCE SETTING METHOD

BACKGROUND OF THE INVENTION

This invention relates to the technical field of photoelectric reading of the image recorded on originals, used for photographic printers and image recording apparatus.

Images recorded on photographic film originals (hereunder referred to simply as "films") such as negative films and reversal films are conventionally printed onto photographic paper and other light-sensitive materials by "direct" exposure, or a method in which the recorded image of the film is projected onto the light-sensitive material for areal exposure.

A recent model under development is printers that rely upon "digital" exposure. Called a "digital photoprinter", this apparatus reads photoelectrically the image information recorded on a film, applies various steps of image processing to provide recording digital image information, records the image (latent image) by scan exposing the light-sensitive material with recording light modulated in accordance with the image information, and produces a print.

In digital photoprinters, the time required for the exposure per one image for the print is short and the exposure time in accordance with the image size is constant, since the film is photoelectrically read and subjected to the color/density corrections by means of signal processing to determine the exposure conditions. Therefore, the development can be performed more quickly than in the conventional areal exposure.

Further, it is easy to perform editing jobs such as synthesizing a plurality of images into a composite image or dividing a single image into segments and procedures of image processing such as color/density adjustments, and finished prints can be produced after desired editing and image processing has been made in accordance with a specific use. In addition, the image recorded in the finished print can be stored as image information in the external storage media such as floppy disks and this offers the advantage that extra printing and other jobs can be accomplished without any films that serve as the original. What is more, extra printing and other jobs can be performed in a rapid and efficient manner without repeating the setting of exposing conditions.

Furthermore, with prints produced by the conventional "direct" exposure, not all of the image recorded in films and the like can be reproduced in such aspects as resolution and color/density reproducibility. In contrast, digital photoprinters are capable of outputting prints that feature almost complete reproduction of the image (density information) recorded on the films.

The basic components of the digital photoprinter under consideration are an image reading apparatus for reading the image recorded on the film, a setup apparatus that performs image processing operations on the thus read image to determine the exposing conditions for image recording, and an image recording apparatus that performs development after a light-sensitive material was scan exposed in accordance with the determined exposing conditions.

The assignee invented various image reading apparatus and methods for realizing such digital photoprinters and proposed them in Unexamined Published Japanese Patent Application Nos. 217091/1994, 233052/1994 and 245062/1994, together with the disclosure of an outline of the digital photoprinter.

In the image inputting apparatus used in the digital photoprinter and other apparatus, the reading light emitted from a light source is applied to the original so as to obtain projecting light (or reflecting light) that bears the original image and which is then projected onto an image sensor such as a CCD (Charge Coupled Device) sensor in a sufficiently focused position to read the original image photoelectrically.

From an S/N (signal/noise) ratio view point, the image reading with the image sensor is preferably conducted with such a quantity of light that the output from the image sensor reading the brightest area of the image on an original or its nearby area is its saturation output.

In fact, however, the image density differs from one original to another and it is impossible to uniquely determine the quantity of light from the source that is appropriate for all kinds of original.

Under these circumstances, it is preferred for the image inputting apparatus to employ a light source which emits more light than is required to saturate the output of the image sensor in the absence of an original in the optical path, with a variable aperture stop being provided in the optical path from the light source to the image sensor and with image reading being performed by adjusting the degree of opening of the stop such that the sensor output corresponding to the brightest area of the image on the original approximates the saturation output of the sensor.

With the image inputting apparatus, main scanning for reading the image in order to produce the final output image is usually preceded by prescanning for rough image reading in order to determine the image processing and reading conditions and, hence, the degree of opening of the variable aperture stop in main scanning is determined in accordance with the image information obtained by the prescanning operation.

Needless to say, the output of the image sensor for the brightest area of the original image is preferably close to the saturation output of the image sensor even in the prescanning. However, as already mentioned, the image density varies from one original to another and it is difficult to determine the degree of opening of the variable aperture stop for the prescanning of an individual original; therefore, it is necessary to set a basic quantity of reading light, or illuminance, that is adapted for the reading apparatus.

In addition, the quantity of light from the source and the efficiency of optics (optical devices) usually involve individual differences from one reading apparatus to another and, hence, the setting of illuminance has to be performed for each apparatus. What is more, the quantity of light from the source varies with time due, for example, to aging and the deposit of dust particles and other foreign matter, so it is preferred to perform the setting of illuminance at each start-up of the reading apparatus. Further in addition, the sensitivity of the image sensor and the components of the reading light issuing from the light source usually differ for each of the three primary colors, red (R), green (G) and blue (B); therefore, with an apparatus for reading color images, illuminance is preferably set for each of the three primaries.

SUMMARY OF THE INVENTION

An object of the invention is therefore to provide a method by which the setting of illuminance for setting the basic quantity of reading light of the image inputting apparatus such as the reading apparatus of the above digital photoprinter used to read original images by photoelectric means can be accomplished easily and with high efficiency.

In order to achieve the object described above, the present invention provides a method for use with an image inputting apparatus to set illuminance of reading light emitted from a source and which has been adjusted in quantity by means of a light source stop, said reading light being allowed to be incident on an original to produce light that is either projected onto or reflected from said original, with the thus projected or reflected light being read with an image sensor photoelectrically, wherein measurement with the image sensor is performed with said light source stop being adjusted to a specified initial value of degree of opening in the absence of original in an optical path; and if an output from the image sensor is not within a specified range, either adjustment of the quantity of the light from the source or readjustment of said light source stop using a light source stop table which represents the relationship between the degree of opening of said light source stop and the output of the image sensor or both the adjustment of the quantity of the light from the source and the readjustment of said light source stop are performed and another measurement with the image sensor is performed in the absence of original in the optical path and these steps are repeated until the output from the image sensor comes to fall within the specified range; and if said output falls within the specified range, the corresponding quantity of the light from the source and the corresponding degree of opening of the light source stop are set as values representing the reference state of the light source for the image reading mode.

It is preferred that said light source stop table represents the relationship between the degree of opening of said light source stop and a normalized density value and has been constructed by investigating the relationship between the degree of opening of said light source stop and the output of the image sensor and normalizing to density the output of the image sensor at each value of the degree of opening as referenced to the output of the image sensor at a given value of the degree of opening and that a density value X is determined from the output of the image sensor in the absence of original in said optical path by the following equation (1) and the thus determined density value X is used as a criterion for determining whether or not said output has come to fall within a specified range:

$$X = -\log(C_{out}/C_{ref}) \qquad (1)$$

where $C_{out}$ is the output of the image sensor and $C_{ref}$ is a target output as set in view of the saturated output of the image sensor.

It is also preferred that the image reading is a color image reading that is performed with the image on the original being separated into three primary colors and that said reference state is set for each of the images of the three primary colors to be read such that regarding the second and third colors for which the reference state is to be set, the quantity of the light from the source is fixed and only the readjustment of the light source stop using said light source stop table is performed to set the reference state.

BRIEF DESCRIPTION OF THE DRAWINGS

FIGS. 4a, 4b and 4c are schematic perspective views showing the procedure of exchanging carriers on the image inputting apparatus shown in FIG. 1;

DETAILED DESCRIPTION OF THE INVENTION

The illuminance setting method of the invention will now be described in detail with particular reference to the preferred embodiments shown in the accompanying drawings.

Figure 1:
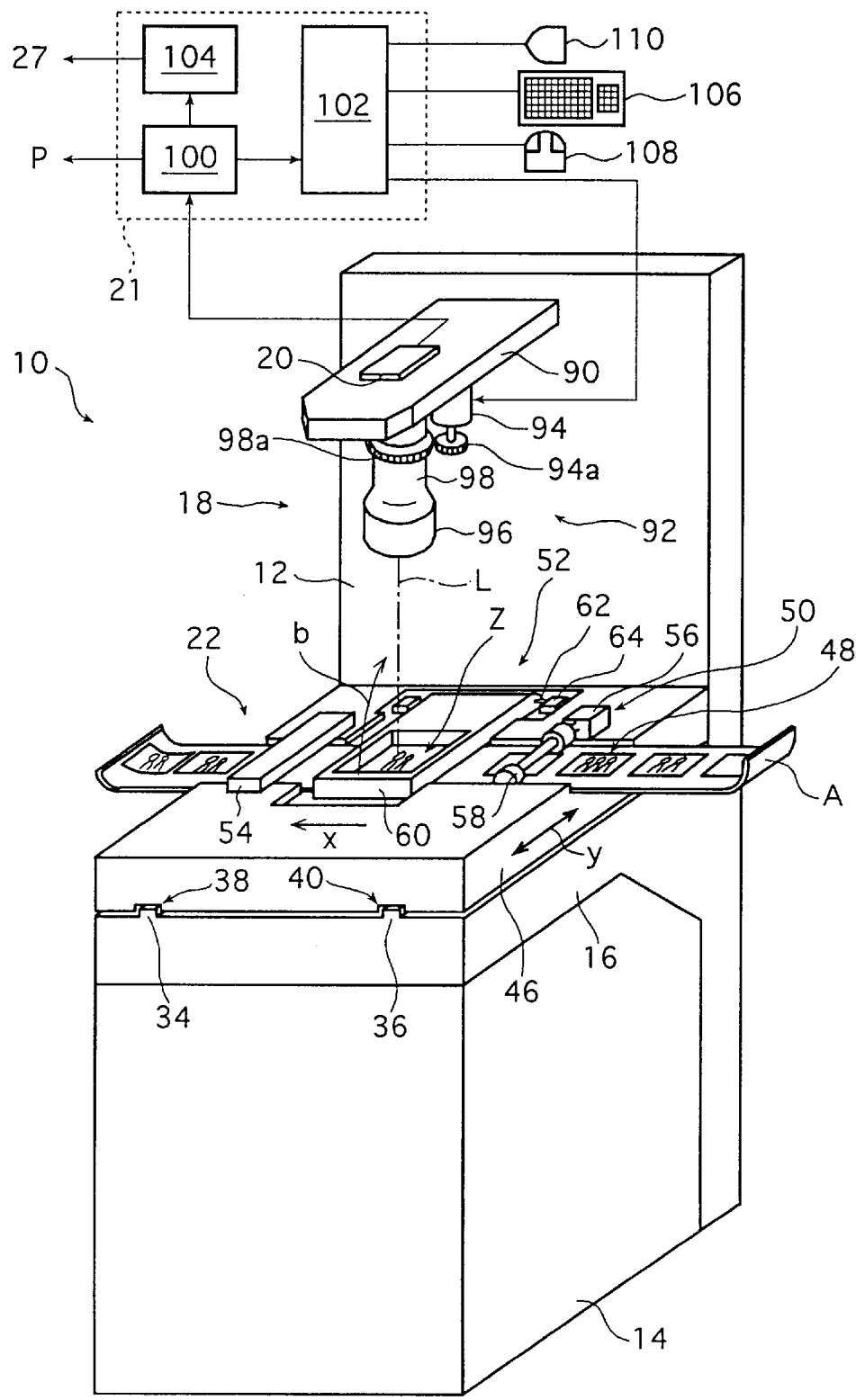
FIG. 1 is a schematic perspective view showing an example of the image inputting apparatus using the illuminance setting method of the invention.

FIG. 1 is a schematic perspective view showing an example of the image inputting apparatus applying the illuminance setting method of the invention, with control section 21 being presented in a block diagram. The image inputting apparatus (hereunder referred to simply as an "input apparatus") which is generally indicated by 10 is an apparatus to read photoelectrically the image recorded on the original which is either a strip A having a multiple of images recorded on an elongated negative or reversal film or, alternatively, a slide B which is usually a reversal film fixed on a mount. The components of the input apparatus 10 are an optical frame 12, a light source section 14, a carrier base 16, an imaging section 18, a CCD sensor which is an image sensor, a control section 21, and a film carrier 22 and a slide carrier 24 (see FIGS. 4 and 5) that are detachably mounted on the carrier base 16.

In the embodiment shown in FIG. 1, the illuminance setting method of the invention was utilized in the image inputting apparatus for reading the image on the color transparency. The invention is not in any way limited to this, but the present method can be suitably utilized for reading the image on the reflection copy.

The input apparatus 10 transports the strip A or slide B (hereunder referred to simply as an "film") to the reading position Z by means of the film carrier 22 or slide carrier 24 that is mounted on the carrier base 16. The image is then illuminated with reading light emitted from the light source section 14 to produce projecting light that bears the image on the film. The projecting light passes through the imaging section 18 such that it forms a focused image on the CCD sensor 20 which performs photoelectric conversion on the image; the output signal (image data signal) from the CCD sensor 20 is processed in the control section 21, whereby the image recorded on the film is read photoelectrically.

Figure 2:
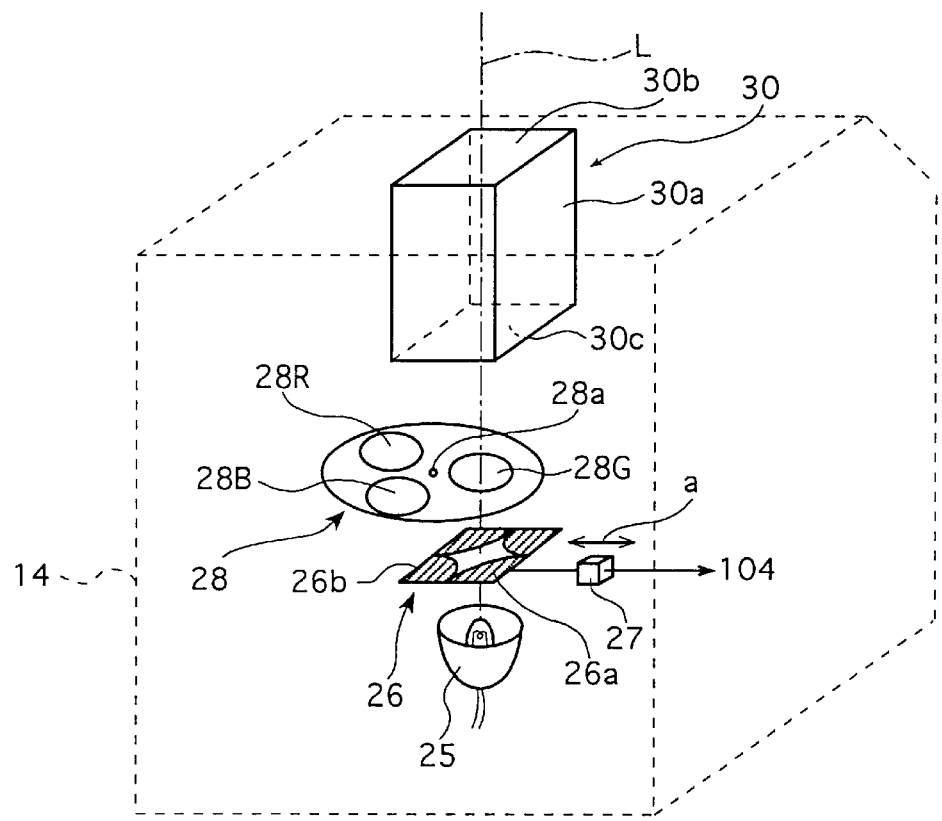
FIG. 2 is a schematic perspective view of the light source section in the image inputting apparatus shown in FIG. 1.

FIG. 2 is a schematic diagram of the light source section 14. Being a component of the input apparatus 10 shown in FIG. 1, the light source section 14 is for illuminating the reading light of which the quantity was adjusted, with light from below so as to create the projecting light that bears the image. The light source section 14 having this capability is located under the carrier base 16 of the optical frame 12 and has a halogen lamp 25, a aperture stop 26, a color filter plate 28, and a diffusion box 30. The light source section 14 additionally includes fans for cooling the halogen lamp 25 and various other members.

The halogen lamp 25 is a source of the reading light and in the illustrated case, it is adapted to be such that the quantity of light it issues is adjustable by controlling the voltage applied to it. The quantity of light from the source is set by the illuminance setting method of the invention to be described hereinafter.

Aside from the halogen lamp, various other known light sources capable of emitting a sufficient quantity of reading light to permit image reading with the CCD sensor 20 may be used in the invention, as exemplified by a xenon lamp and a mercury lamp.

The stop 26 is associated with the light source and functions to adjust the quantity of reading light incident on the original film. In the illustrated case, it is a variable aperture stop that employs two ND filters 26a and 26b each having a light shielding area delineated by logarithmic curves and which permit different quantities of light transmission in the direction of a plane on which said logarithmic curves are formed, as well as moving means (not shown) using a motor 27 as a drive source.

Figure 3:
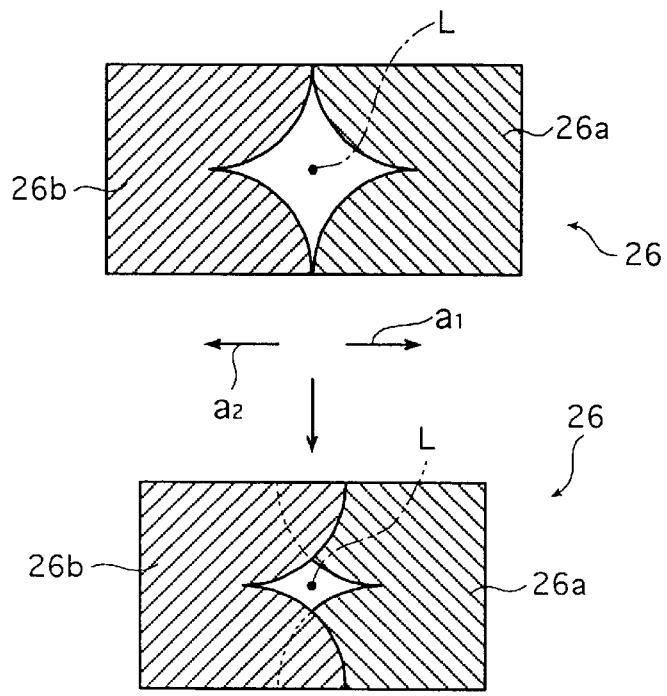
FIG. 3 is a diagram showing the operation of the (variable) aperture stop in the light source section shown in FIG. 2.

As shown in FIGS. 2 and 3, the open sides of the ND filters 26a and 26b which are less occupied by the light shielding area face each other and those filters are disposed in a plane perpendicular to the optical axis L (normal to the paper of FIG. 3) such that it coincides with the most open area. By bringing the ND filters 26a and 26b to come closer to or depart from each other in said plane in the directions of arrows $a_1$ and $a_2$ by means of the moving means, for example, drive screw having two different screw-parts in the reverse directions each other and two travelling nuts, and the motor 27, one can adjust the degree of opening, or the area of transmission of the reading light issuing from the halogen lamp 25, so that the quantity of reading light transmitted through the stop 26 is adjusted to thereby control the quantity of reading light incident on the original film.

The motor 27 is a pulse motor and the adjustment of the quantity of light with the stop 26, or the control of the degree of its opening, is performed by pulse control with an aperture control unit 104 using a light source stop table to be described below which represents the relationship between the degree of opening of the stop 26 and the output of the CCD sensor 20; in addition, a normalized value of the degree of opening which serves as the reference for the degree of opening of the stop 26 during image reading is set by the illuminance setting method of the invention. Details of these points will be given later in this specification.

The means for moving the ND filters 26a and 26b using the motor 27 as a drive source is not limited to any particular type and various known means for moving plates may be employed, as exemplified by the use of screw transmission such as the drive screw and the travelling nuts, cams, a link mechanism and a rack-and-pinion mechanism.

The light source stop to be used in the invention is not limited to the illustrated case of using ND filters that transmit different quantities of light in the planar direction perpendicular to the optical axis L and known types of variable aperture stops may be employed as exemplified by an iris diaphragm and an assembly of stop plates.

The color filter plate 28 is a disk-shaped member having three through-holes fitted with a corresponding number of color filters, R (red) filter 28R, G (green) filter 28G and B (blue) filter 28B, and which is adapted to be rotatable about the axis 28a by a rotating means (not shown).

In an image reading mode, R filter 28R, G filter 28G and B filter 28B are sequentially inserted into the optical path L, whereby the image recorded on the film is separated into three primary colors R, G and B, for subsequent reading.

As will be discussed below in detail, the CCD sensor 20 does not have uniform sensitivity to the light of three primary colors R, G and B but its sensitivity to B light is low whereas the sensitivity to R light is high. In addition, the reading light from the halogen lamp 25 has a comparatively high proportion of R component. Therefore, the output of the CCD sensor 20 which results from the reading of the image on the film has high proportion of R color but low proportion of B light, thus failing to assure a good balance between R, G and B colors.

To deal with this situation, the illustrated case of the input apparatus 10 adjusts the spectral characteristics of the respective color filters and the size of the through-holes to be fitted with the respective color filters in such a way that the R filter 28R permits the smallest amount of light to be transmitted whereas the B filter 28B permits the greatest transmission of light to thereby attain a balance between the R, G and B outputs from the CCD sensor 20.

The diffusion box 30 is used to make the quantity and other features of the reading light incident on the film uniform over the film surface. In the illustrated case, the diffusion box 30 comprises a prism 30a having internal specular surfaces, of which the top and bottom surfaces are open and comprise respectively a milky white polyacrylic plate 30c and a ground glass 30b. Other known means of diffusing light such as opal glass may of course be employed.

The carrier base 16 is disposed above the light source section 14 and provides a site for carrying the film carrier 22 or slide carrier 24 and holding them in a specified position. The carrier base 16 is secured perpendicular to the optical frame 12.

The carrier base 16 has an opening 32 formed in an area corresponding to the optical axis L to permit the passage of the reading light emitted from the light source 14.

As shown in FIG. 4, the carrier base 16 has guide rails 34 and 36 formed on the top surface in a direction away from the operator toward the optical frame 12, namely, in the direction of arrow y which is perpendicular to the film transport direction indicated by arrow x.

Grooves 38 and 40 are formed in the bottom surface of the film carrier 22 in positions that correspond to the guide rails 34 and 36. On the other hand, grooves 42 and 44 are formed in the bottom surface of the slide carrier 24 in positions that correspond to the guide rails 34 and 36. The respective carriers which are placed on top surface of the carrier base 16 have their positions restricted in the direction of arrow x by the combinations of the guide rails 34 and 36 with the corresponding grooves. When the carriers contact the optical frame 12, the carriers will not move any further in the direction of arrow y. Thus, the respective carriers which are placed on top of the carrier base 16 have their position determined.

The film carrier 22 transports the strip (sleeve) A intermittently in the direction of arrow x such that each image recorded on the strip A is sequentially transported to a specified position on the optical axis L, namely, the reading position Z corresponding to the opening 32 in the carrier base 16, for subsequent reading.

The bottom surface of the main body 46 of the film carrier 22 is provided with the groove 38 corresponding to the guide rail 34 on the carrier base 16, as well as the groove 40 corresponding to the guide rail 36 also formed on the carrier base 16.

The top surface of the main body 46 is provided with a guide groove 48 in an area intercepting the optical axis L which extends across the main body 46 in the transport direction indicated by arrow x. The guide groove 48 has substantially the same width as the strip A, which is fitted into the groove 48 and transported in a longitudinal direction which agrees with the direction x such that the individual images are sequentially transported to the reading position Z. To this end, the depth of the guide groove 48 is adjusted such that the image plane of the strip A is in a specified position along the optical axis L (in the direction of focal depth).

An opening for admitting the passage of the reading light from the light source section 14 is formed in the reading position Z in the main body 46 of the film carrier 22. This opening also serves as a mask for restricting the reading light incident on the strip A.

The guide groove 48 is fitted with a transport means 50, a film compressing unit 52 and an image plane detecting sensor 54 which are arranged in that order in the transport direction x.

The transport means 50 consists of a motor 56 and transport rollers 58 and transports the strip A in the direction of arrow x. For example, when the result of detection with the image plane detecting sensor 54 shows that an image has come to the reading position Z, the transport means 50 stops transporting the strip A and, upon receiving a READ END signal from the control section 21, the transport means 50 resumes the transport of the strip A until the subsequent image is transported to the reading position Z.

The film compressing unit 52 compresses the periphery of the image of the strip A onto the guide groove 48 in the reading position Z in an image reading mode such that a curl and other habits of the strip A are eliminated to insure that the entire image surface is held in a specified position along the optical axis L. The film compressing unit 52 having this capability is composed of a compressing member 60 and a pivoting means 64 that causes the compressing member 60 to pivot on the shaft 62 in the direction of arrow b. When the strip A is being transported, the compressing member 60 is in an UP position as the result of movement by the pivoting means 64 and in the reading mode, the compressing member 60 is in a DOWN position to depress the strip A in the reading position Z.

The image plane detecting sensor 54 is a known optical sensor which detects not only the image recorded downstream of the reading position Z in the direction x but also the DX code. In the illustrated film carrier 22, the result of detection with the image plane detecting sensor 54 is relied upon to control the transport of the strip A by the transport means Z, with the strip A being brought into engagement or disengagement with the film compressing unit 52.

The slide carrier 24 transports the slide B in the direction of arrow x and stops it at the reading position Z, where it is subjected to image reading. A plurality of slides B on which the reading operation has completed are collected.

Figure 5:
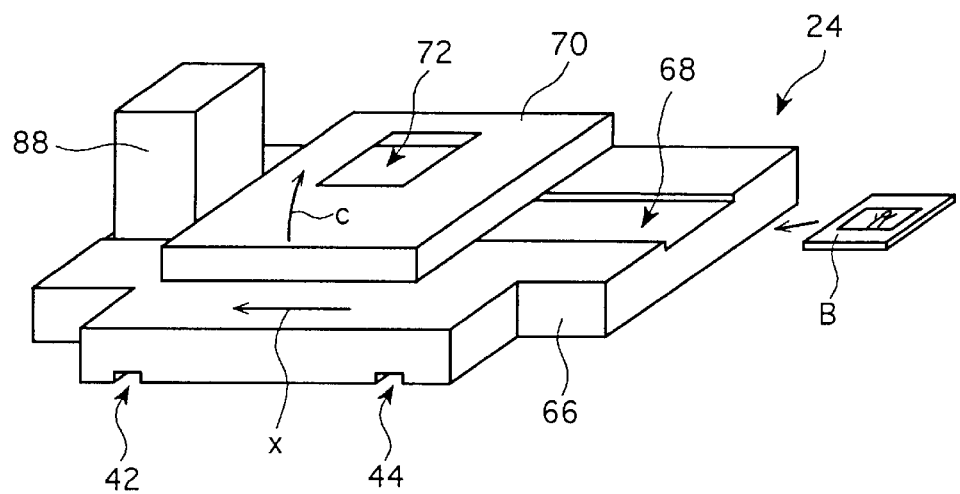
FIG. 5 is a perspective schematic view of the slide carrier that may be mounted on the image inputting apparatus shown in FIG. 1.

As shown in FIG. 5, grooves 42 and 44 corresponding to the guide rails 34 and 36 on the carrier base 16 are formed in the bottom surface of the main body 66 of the slide carrier 24.

The top surface of the main body 66 is provided with a transport stage 68 for positioning and transporting the slide B; the transport stage 68 extends in the transport direction of the slide B, that is, in the direction of arrow x. The position of the slide B on the transport stage 68 is set so that when a standard slide B is placed in that transport stage, the image plane of the slide B is substantially in a specified position along the optical axis L. It should, however, be noted that since the thickness of the mount of slide B varies with the manufacturer and specifications, the image plane is variable in the direction of the optical axis L. To deal with this problem, the input apparatus 10 performs automatic focus adjustments and thereby ensures that the projecting light will form the correct focused image on the image-receiving plane of the CCD sensor 20.

The main body 66 of the slide carrier 24 is also provided with an opening 22a that is formed in the reading position Z and which admits the light from the light source section 14.

A cover 70 is disposed on top of the main body 66 in an area surrounding the reading position Z. The cover 70 is an enclosure that has a through-hole 72 formed in the top surface to permit the passage of the projecting light on the slide B and which is open at the bottom. In the normal reading mode, the reading position Z is covered but, if necessary, the cover 70 can be opened by pivoting in the direction of arrow c about the lower edge of the farthest side remote from the operator, whereby the reading position Z becomes exposed.

Figure 6:
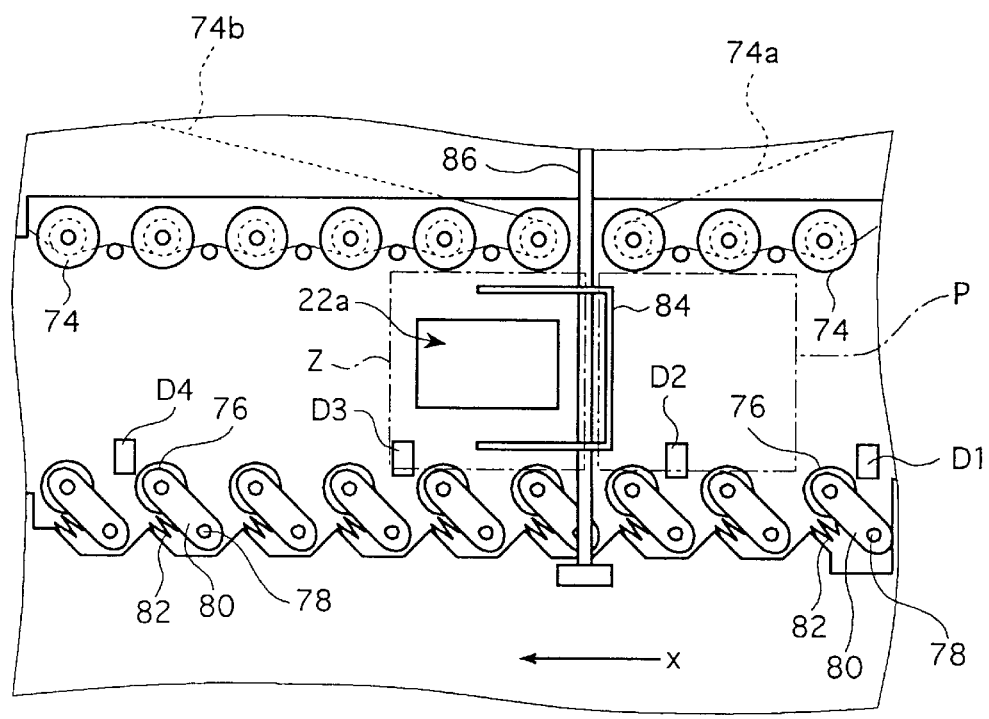
FIG. 6 is a schematic plan view showing the area around the reading position in the slide carrier shown in FIG. 5.

FIG. 6 is a schematic plan view of the area around the reading position Z with the cover 70 opened. As shown, that part of the slide carrier 24 which is covered with the cover 70 is provided with four sensors: the first sensor D1 for detecting the supply of slide B by the operator, the second sensor D2 for detecting slide B in a standby position P where it is waiting for the next reading operation to start, the third sensor D3 for detecting slide B in the reading position Z, and the fourth sensor D4 for confirming that slide B has been discharged into a slide recovery box 88 (see FIG. 5).

The slide carrier 24 is provided with nine rollers for transporting the slide B on either side of the guide groove 68 in a direction parallel to the direction of arrow x, with adjacent rollers being spaced by a distance corresponding to the size of slide B.

The rollers in the upper part of FIG. 6 are rollers 74 for transporting the slide B and comprise two drive groups, the first group comprising three drive rollers positioned upstream in the direction of arrow x and the second group comprising six drive rollers positioned downstream in the same direction. The first group of drive rollers are driven by an endless belt 74a connected to a drive source (not shown) and by means of these rollers, the slide B supplied by the operator is transported to either the standby position P or a point just before the reading position Z. The second group of drive rollers are driven by an endless belt 74b connected to another drive source (not shown) and they receive the slide B from the first drive group of rollers, transport it to the reading position Z, reject it from the reading position Z when the reading operation ends, and transport it to the slide recovery box 88.

The rollers in the lower part of FIG. 6 are free rollers (followers) 76, each of which is rotatably supported at an end of an arm 80 which is pivotally mounted on a fulcrum 78. The arms 80 are urged toward the driving rollers 74 by means of springs 82. Therefore, the slide B is positively transported as it is pressed against the driving rollers 74 by means of the free rollers 76; at the same time, the difference in size between successive slides B is absorbed by the pivoting action of the arms 80 which support the free rollers 76.

A slide holder 84 is disposed in the reading position Z. The slider holder 84 is adapted to be capable of pivoting as a result of the rotation of a shaft 86 by a drive source (not shown) so that in a reading mode, the farther end of the holder 84 (which is opposite the side where the shaft 86 is provided) depresses the slide B against the transport stage 68 and thereby eliminates any deformations and other defects of the slide B (particularly its mount).

The slide recovery box 88 is disposed downstream of the cover 70 in the direction of arrow x for collecting slides B for which the reading operation has ended. In the slide recovery box 88, slides B are accommodated in such a way that each slide B is slid under the already recovered slide B by suitable means such as transport rollers projecting slightly above the surface of the transport stage 68; thus, after the reading operation, the slides B are recovered by being stacked with the last coming slide being slid under the previous one.

In the illustrated slide carrier 24, the operator first places the slide B in the transport stage 68 and feeds it manually to the position of sensor D1 as it is guided by the side walls of the transport stage 68. When sensor D1 detects the slide B, the transport rollers 74 of the first drive group, or those of the second drive group will start to rotate and transport the slide B either to the reading position Z (if the slide B is not detected with sensor D2) or to the waiting position P (if the slide is detected with sensor D2), where the rotation of the rollers 74 stops.

When image reading is effected in the reading position Z and if a signal indicating the end of image reading is received from the control section 21, the transport rollers 74 start to rotate again causing the slide B to be accommodated in the recovery box 88.

The imaging section 18 is disposed in the upper part of the carrier base 16 (carrier). Having a lens unit 92 suspended from a platform 90 fixed to the optical frame 12 and a focusing motor 94, the imaging section 18 ensures that the projecting light bearing the film image will form a focused image on the CCD sensor 20.

The lens unit 92 is composed of a zoom lens portion 96 and a focusing lens portion 98 positioned upward (downstream in the direction of the optical axis L). The zoom lens portion 96 incorporates a known zoom lens that changes the magnification according to the film size and which adjusts the projecting light to a maximum size that can be received by the CCD sensor 20 (i.e., the size at which the longest side of the required image region is inscribed by the light-receiving plane of the CCD sensor 20) to form a focused image on the CCD sensor 20. The focusing lens portion 98 incorporates a known focusing lens for adjusting the projecting light to focus on the image-receiving plane of the CCD sensor 20. The focusing lens portion 98 has an adjustable gear 98a that meshes with a gear 94a that is rotatably driven by the focusing motor 94; thus, the focusing lens portion 98 is actuated by the focusing motor 94 to perform focus adjustment.

The drive of the focusing motor 94 is controlled by the control unit 102 in the control section 21 and the illustrated input apparatus 10 performs automatic focusing by a TTL (through-the-lens) method using the contrast of the original images obtained by reading with the CCD sensor 20.

The projecting light bearing the film image is processed by the lens unit 92 to form a focused image on the CCD sensor 20, which is then read photoelectrically. Provided between the lens unit 92 and the CCD sensor 20 is a shutter the principal function of which is to measure the dark current of the CCD sensor 20.

In the input apparatus 10, the CCD sensor 20 is exemplified by an area CCD sensor of 1380×920 pixels. In the illustrated apparatus, the CCD sensor 20 is adapted to be movable in both x- and y-directions by an amount corresponding to half a pixel and this increases the apparent number of reading pixels by a factor of up to four. According to the invention, various other known sensors than the CCD sensor can be employed as image sensor.

As already mentioned, the CCD sensor 20 does not have uniform sensitivity to the light of three primary colors R, G and B but the sensitivity to B light is low whereas the sensitivity to R light is high. In addition, the light from the halogen lamp 25 working as the light source has a comparatively high proportion of R component. Further in addition, the image recorded on a negative film differs in the color balance between R, G and B from the image recorded on a reversal film and, furthermore, the density balance is different between R, G and B in the negative and reversal films.

Therefore, if the image on the negative film is read under the same conditions as the image on the reversal film, the output from the CCD sensor 20 will vary considerably between the two types of film; even in the same type of films, a similar problem occurs between the R, G and B outputs if the image reading conditions are identical.

One way to assure a good balance between the R, G and B outputs from the CCD sensor 20 would be to change the degree of opening of the stop 26 in each of R, G and B. However, in order to achieve this solely by means of the stop 26, the degree of opening has to be varied greatly for the respective color components R, G and B and the amount by which the stop 26 is adjusted in the reading of the respective colors is so much increased that it takes a very long time to adjust the stop 26, therefore to read an image; in addition, the range over which the quantity of light can be adjusted by means of the stop 26 will be eventually reduced.

To deal with this problem, the input apparatus 10 is adapted so that the storage time (electronic shutter speed) of the CCD sensor 20 is changed not only between the readings of a negative and a reversal film but also between R, G and B components; furthermore, as already mentioned, the quantity of light transmission through the respective color filters on the color filter plate 28 is changed between the respective color components R, G and B. By means of this design, it is assured that the R, G and B outputs from the CCD sensor 20 in the image reading operation are rendered to be as close as possible to the original values.

In other words, the electronic shutter speed of the CCD sensor 20 and the quantity of light transmission through the color filter plate 28 are respectively adjusted in the negative and reversal films, and in the R, G and B color components, to thereby ensure a balance of the R, G and B outputs from the CCD sensor 20 such that the movement of the stop 26 during image reading is minimized to secure the range over which the quantity of the reading light can be adjusted, improve the reading efficiency (print production rate) by shortening the time required to adjust the stop 26, and to secure the reliability of the means of moving the stop 26 and the motor 27.

There is not particular limitation on the amount by which the electronic shutter speed should be adjusted and it may be determined appropriately on an empirical basis in accordance with various parameters such as the characteristics of the CCD sensor 20, the optical characteristics of the respective color filters and the quantity of light transmission through each filter. However, it should be noted that the electronic shutter speed must be set within the tolerable limits of smear. The specific values of electronic shutter speed in the various aspects of image reading mode are preliminary set as design values in the input apparatus 10.

Typical examples of such electronic shutter speed values are listed in the following table:

|  | R | G | B |
| --- | --- | --- | --- |
| Negative film | 0.165 | 0 | 0 |
| Reversal film | 0.01 | 0.3 | 0 |

Each of the values in the table represents an electronic shutter speed as converted to a density value D. Assume, for example, that the CCD sensor 20 has a storage time variable from 20 to 50 msec; with the storage time of 50 msec being taken as zero, the storage time for the CCD sensor 20 is shortened for component R with a negative film such that the density D to which the R output of the sensor has been converted is reduced by 0.165.

Output signals from the CCD sensor 20 are sent to the control section 21 having an image processing unit 100, a control unit 102 and an aperture control unit 104.

The control unit 102 controls the parts of the input apparatus 10 (or digital photoprinter) both individually and as a whole. The control unit 102 is connected to a display 106, a keyboard 108 and a mouse 110 to constitute a manipulation system for the input apparatus 10 (digital photoprinter). The display 106 displays the images read with the image sensor 18, as well instructions for performing various operations such as print size setting, color/density adjustments and mode selection. The keyboard 108 and the mouse 110 are manipulated by the operator to run the input apparatus 10 typically for entering various kinds of settings and operational instructions in accordance with the displays on the display 106 and with predetermined procedures. The control unit 102 also performs focus adjustment on the lens unit 92 by means of the focusing motor 94.

Prior to main scanning, the image processing unit 100 performs prescanning for rough image reading and the output signal (image data signal) from the CCD sensor 20 is subjected to specified steps of image processing including A/D conversion and logarithmic transformation to construct density histograms, set the conditions for various kinds of image processing to be performed during main scanning. During the subsequent main scanning for producing output images, the output signal from the CCD sensor 20 is subjected to specified processes such as A/D conversion, logarithmic transformation, tone correction, shading correction, darkness correction, offset compensation and color/density correction and the thus processed signal is delivered to the image recording unit P as output image information for recording the final image. The image processing unit 100 comprises known image processing circuits for performing the above-described various image processing steps which are combined with other devices such as memories.

The aperture control unit 104 not only performs the illuminance setting method of the invention but also sets the degree of opening of the stop 26 for prescanning, as well as the degree of opening of the stop 26 for main scanning on the basis of the image information obtained by prescanning. The control unit 104 drives the motor 27 in the light source section 14 to adjust the degree of opening of the stop 26 to a desired value.

The aperture control unit 104 stores a light source stop table which represents the relationship between the degree of opening of the stop 26 and the output from the CCD sensor 20, thereby providing a basis for adjustment of the quantity of reading light by means of the stop 26, namely, for controlling the degree of its opening. The illuminance setting method of the invention, as well as the determination of the degree of opening of the stop 26 for both prescanning and main scanning stages are performed with reference to this light source stop table.

The light source stop table is not limited to any particular type as long as it represents the relationship between the degree of opening of the stop 26 and the output from the CCD sensor 20. An example of the preferred embodiment is a light source stop table that represents the relationship between the degree of opening of the stop 26 and a normalized stop value in terms of relative density, as obtained by normalizing to density the output of the CCD sensor 20 at respective values of the degree of opening as referenced to the output of the CCD sensor 20 at a certain value of the degree of opening.

The method of constructing this type of light source stop table will now be described in detail.

The halogen lamp 25 has such a quantity of light that it will saturate the output of the CCD sensor 20 in the absence of a film in the optical path. To deal with this situation, a ND filter is provided in the optical path such that it prevents the output of the CCD sensor 20 from becoming saturated even if the quantity of light is measured with the stop 26 being fully opened in the absence of a film.

The density of the ND filter is not limited to any particular value; however, in order to increase the S/N ratio, it is preferred to select such a value that the CCD sensor 20 will produce a nearly saturated output when the stop 26 is at full aperture.

After the ND filter is disposed in the optical path, one of the color filters is inserted and the output C from the CCD sensor 20 is measured with the stop 26 being at full aperture. As already mentioned, the motor 27 for adjusting the degree of opening of the stop 26 is a pulse motor so that the degree of opening of the stop 26 is pulse controlled. In the illustrated case, the control pulse, or the degree of opening I, for the stop 26 at full aperture is 500.

After the output $C_{500}$ for the stop 26 at full aperture was measured, the stop 26 is closed by one pulse and the output $C_{499}$ of the CCD sensor 20 is measured. Similarly, the output $C_I$ of the CCD sensor 20 ($C_{498}, C_{497}, \ldots C_0$) at respective values of the degree of opening I is measured until the stop 26 is completely closed.

Subsequently, the shutter between the CCD sensor 20 and the lens unit 92 is closed and the dark current D through the CCD sensor 20 is measured. The thus obtained dark current D is subtracted from the raw output $Cs_I$ from the CCD sensor 20 to determine the true output $C_I$ at each value of the degree of opening I by the following equation:

$$C_I = Cs_I - D (I=0-500)$$

Figure 7:
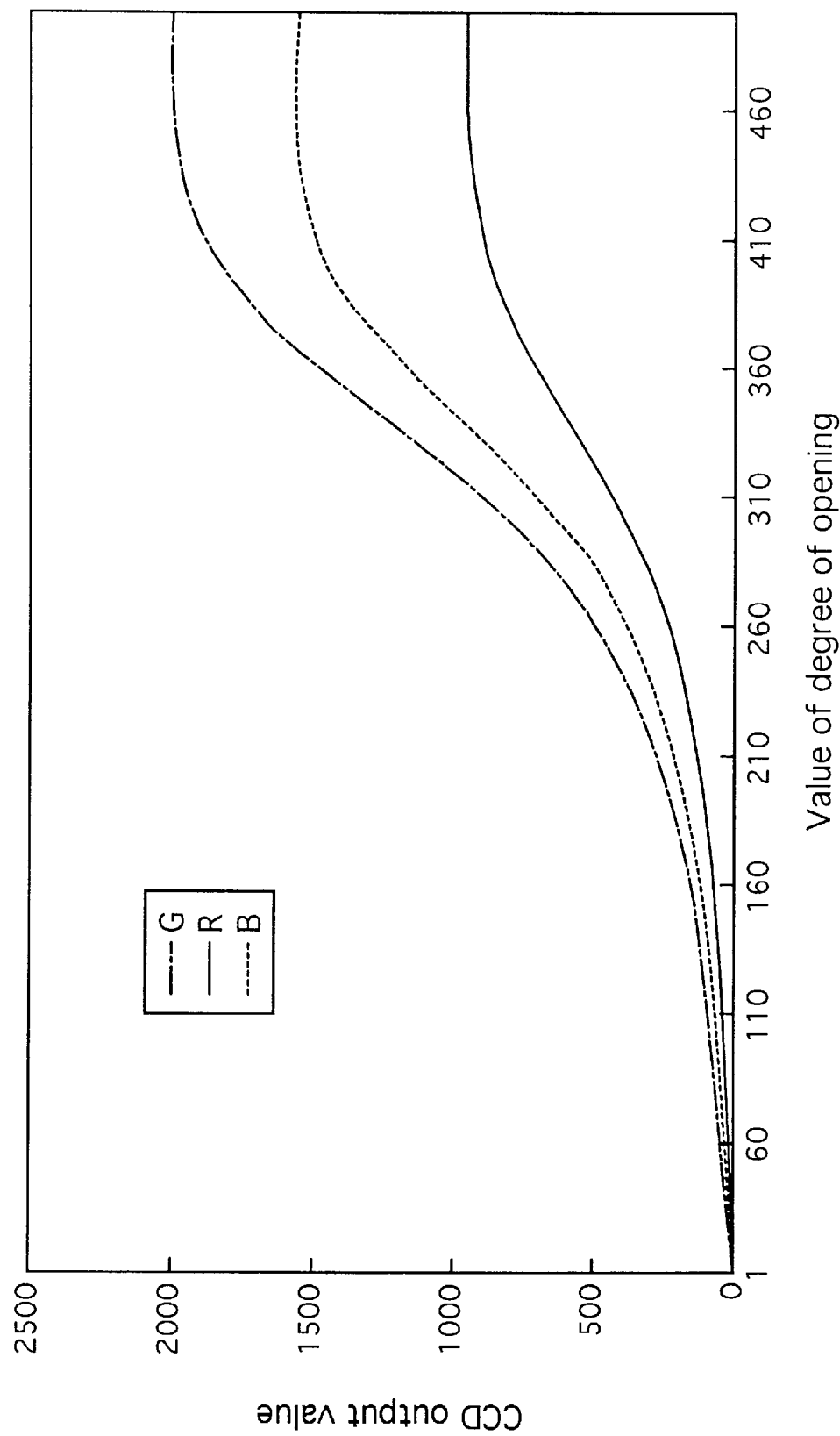
FIG. 7 is a graph showing the relationship between the values of the degree of opening and the output values of the CCD sensor in the color image reading apparatus.

An example of the data obtained by this procedure is shown in FIG. 7, in which the horizontal axis plots the degree of opening I and the vertical axis plots $C_I$ obtained by normalizing output (mV) of the CCD sensor 20.

The output $C_I$ at each value of the degree of opening I is then divided by the output $C_{500}$ for the case where the diaphragm stop 26 is at full aperture and a logarithm is taken so that the output $C_I$ is transformed to a density value $N_I$ as referenced to $C_{500}$ at full aperture of the stop 26 in accordance with the following equation:

$$N_I = -\log(C_I/C_{500}) \ (I=0-500)$$

Figure 8:
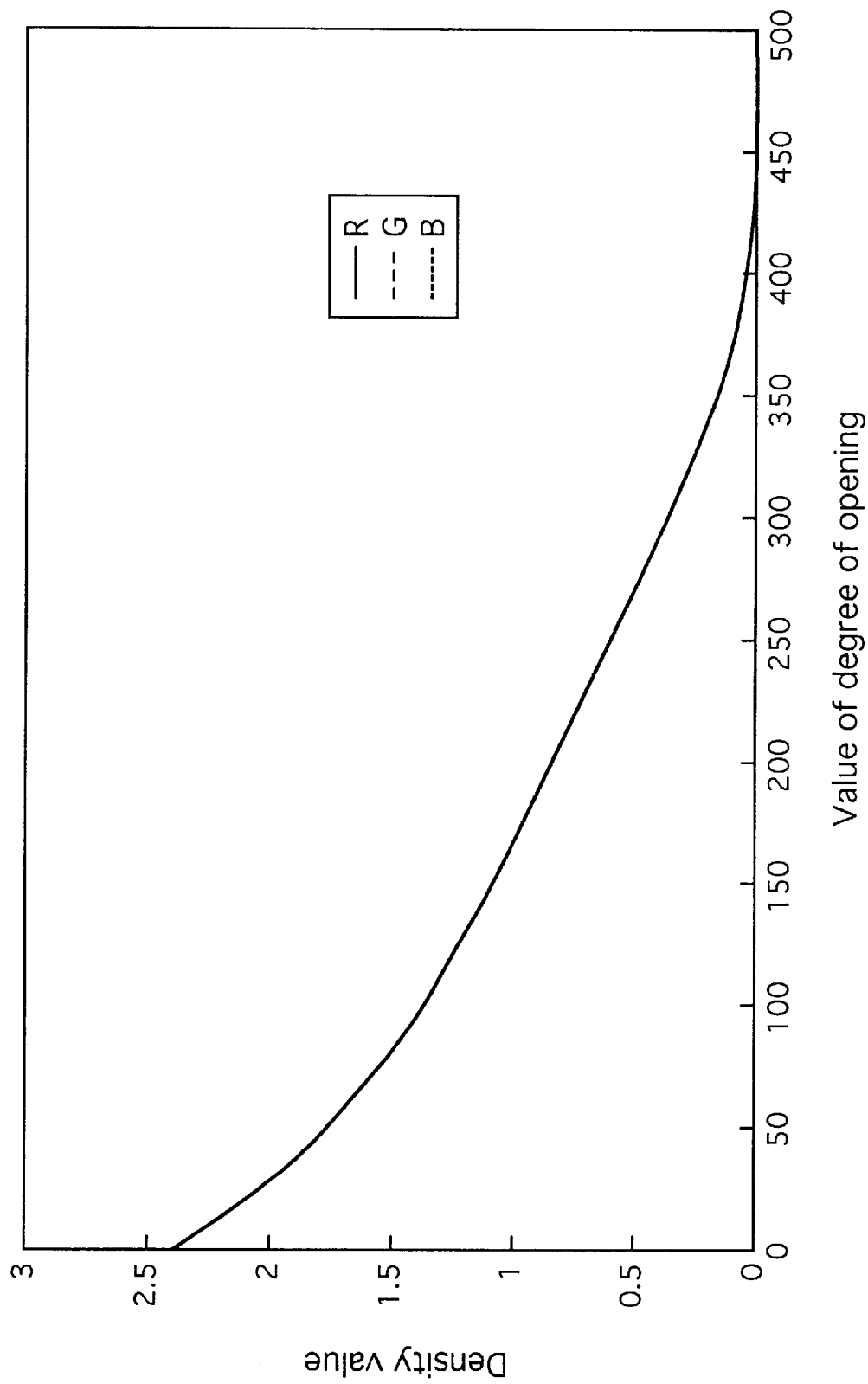
FIG. 8 is a graph in which the output values of the CCD sensor shown in FIG. 7 are transformed to the density values with the full aperture being taken for the reference.

The result of this transformation of FIG. 7 is shown in FIG. 8.

The graph shown in FIG. 8 is a table indicating the number of increments by which the degree of opening I should be adjusted in order to change the density value $N_f$ by a certain amount. In other words, the table indicates the number of pulses by which the stop 26 need be opened or closed in order to attain a desired density.

Finally, a range of 0–2 for the density value $N_f$ in the graph shown in FIG. 8 is divided into 256 equal portions to provide normalized stop values and those values of the degree of opening I which correspond to the respective normalized stop values are determined and a table is stored that represents the relationship between the value of degree of opening I and the corresponding normalized stop value. This table is the light source stop table to be used in the invention.

Figure 9:
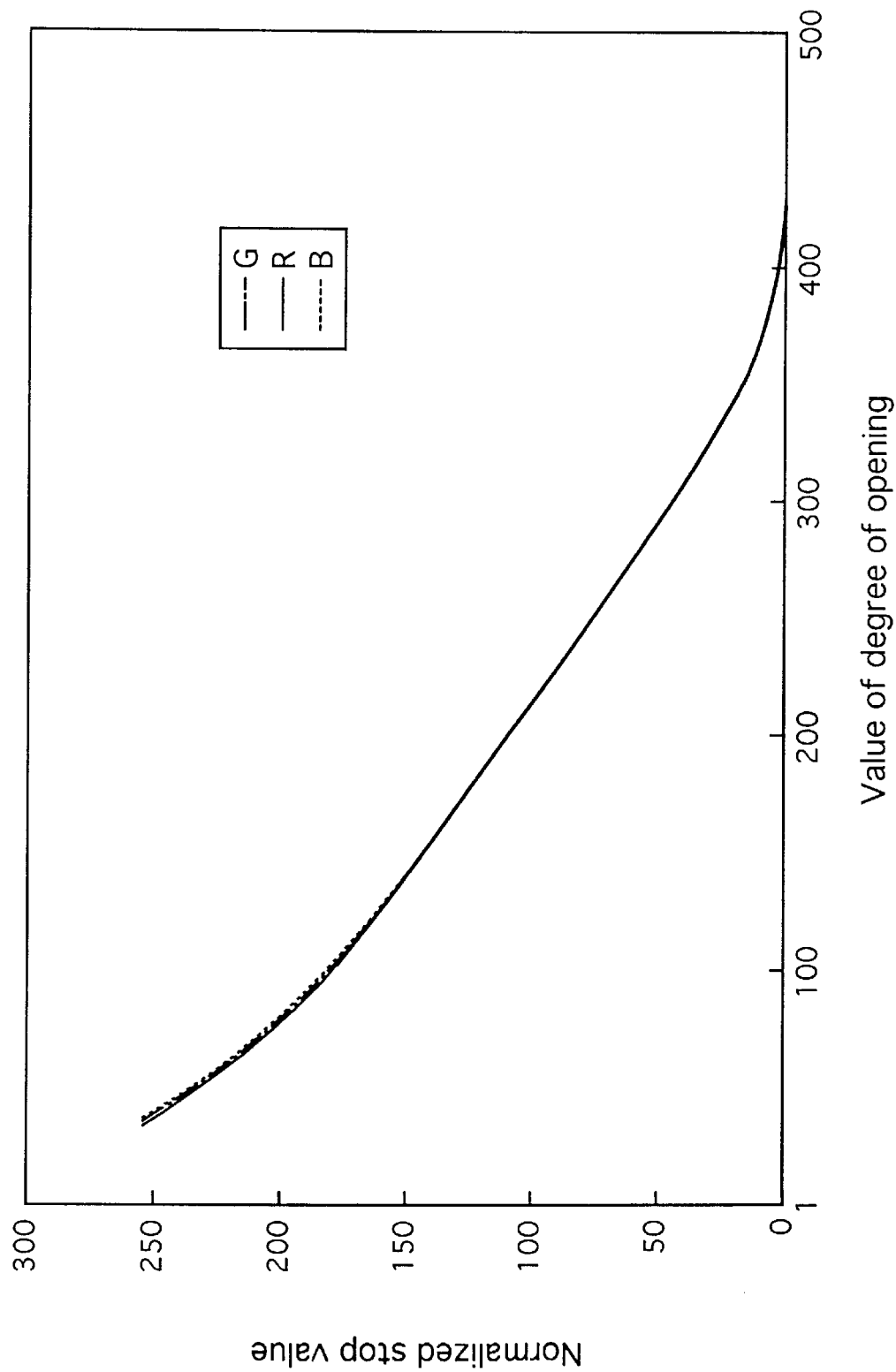
FIG. 9 is a graph in which the density values shown in FIG. 8 are normalized.

FIG. 9 shows an example of the results of transformation of the graph shown in FIG. 8. This density table is such that the density value $N_f$ on FIG. 8 is transformed to 8-bit digital density data (hence, a density value $N_f$ on the vertical axis of FIG. 8 is multiplied by 128 in FIG. 9) to represent the normalized stop value. Thus, the normalized stop value corresponds to digital density data representing 0–255 and the light source stop table indicates the number of pulses by which the diaphragm stop 26 should be opened or closed in order to provide density data of a desired value.

An example of the light source stop table is shown below.

| Normalized stop value | Degree of opening (No. of control pulses) |
|---|---|
| 0 | 500 |
| 1 | 490 |
| 2 | 482 |
| . | . |
| . | . |
| . | . |
| 255 | 50 |

The above-described procedure is repeated for the filters of the respective primary colors R, G and B on the color filter plate 28, which are inserted successively into the optical path L, thereby constructing light source stop tables that correspond to the respective primary colors R, G and B. These light source stop tables are used by the input apparatus 10 to control the value of opening of the stop 26 for the prescanning and main scanning stages and to perform the illuminance setting method of the invention which is described below.

As is clear from FIGS. 7–9, the light source stop tables constructed in the above-illustrated case are associated with the three primary colors, R, G and B. However, as one can see from FIG. 8, the relative density value $N_f$ (normalized stop value) vs the degree of opening I has essentially the same profile for the R, G and B componets. Therefore, if the capacity of the memory in the aperture control unit 104 is of primary importance, a single light source stop table may be shared by the R, G and B components.

Nevertheless, it goes without saying that in order to achieve precise image reading for producing output images of high quality, the light source stop table is preferably constructed for each of the R, G and B components.

It should also be noted that remaking of the light source stop table is necessary if there is a change that causes significant effects on the characteristics of the optics such as where the halogen lamp 25 which is the source of the reading light, the lens unit 92 or the like is replaced.

As already mentioned, the light source stop table has been constructed with a ND filter inserted into the optical path and it represents the relative relationship between the degree of opening I and the normalized stop value (i.e., the output of CCD sensor 20) as referenced to $C_{500}$, or the output of the sensor 20 with the stop 26 at aperture; therefore, the table does not necessarily represent an absolute value of the output (density) at a certain value of the degree of opening I.

From an S/N ratio viewpoint, image reading with the CCD sensor 20 is preferably performed such that a maximal output (namely, an output for a minimal density area) from the CCD sensor 20 is a saturated output and the degree of opening of the stop 26 has to be set in such a manner as to meet this requirement. However, the degree of opening of the stop 26 necessary for producing the desired output cannot be obtained with the light source stop table alone.

Hence, in order to provide reading light the quantity of which is sufficient to produce the desired output, it is necessary to set the reference state of the light source section 14, namely, the illuminance for image reading. The input apparatus 10 in the illustrated case meets this requirement by the illuminance setting method of the invention.

In other words, in the illuminance setting method of the present invention, the light source section 14 is set in such a state that the output of the CCD sensor 20 is saturated in the absence of a film.

The voltage to be applied to the halogen lamp 25 is first set at a specified value and then the saturated output $C_{ref}$ of the CCD sensor 20 is set as a target value.

Subsequently, the degree of opening I of the stop 26 is adjusted to a normalized stop value at which the output of the CCD sensor 20 is anticipated to become nearly saturated in the absence of a film; with this adjustment completed, the G filter 28G on the color filter plate 28 is inserted into the optical path L and the corresponding output $GC_{out}$ of the CCD sensor 20 is measured.

In the next step, the output $GC_{out}$ is divided by the target value $C_{ref}$ and a logarithm is taken to calculate the corresponding density value GX by the following equation (1):

$$GX = -\log(GC_{out}/C_{ref}) \tag{1}$$

The illuminance setting according to the invention comprises adjusting the light source section 14 to such a state that the density value GX (i.e., output $GC_{out}$) is within a specified range.

An exemplary way to implement the illuminance setting method of the invention comprises adjusting the degree of opening I of the stop 26 such that the calculated density value GX will lie within a specified range (this approach is hereunder referred to as method 1).

The density value GX calculated by equation (1) is a numerical measure indicating the amount by which the output $GC_{out}$ at a specific value of the degree of opening I is greater or smaller that the target value $C_{ref}$ in terms of density. Therefore, by feeding back the density value GX, the calculated value of GX can be brought into (or closer to) the desired range.

Stated more specifically, the initial density value GX is calculated in the manner described above and if it is within the specified range, the corresponding normalized stop value is stored in the aperture control unit 104 as a normalized value of the degree of opening $GS_{set}$ for the reading of a G image. If the output $GC_{out}$ of the CCD sensor 20 is saturated, the stop 26 is closed by an appropriate amount and if the density value GX is not within the specified range, the aforementioned light source stop table is used to adjust the degree of opening of the stop 26 by an amount equivalent to the density value GX (or the corresponding normalized stop value) and the output $GC_{out}$ is measured again to calculate the density value GX by equation (1). This procedure is repeated until the density value GX comes to fall within the specified range; when it comes within the specified range, the corresponding normalized stop value is stored in the aperture control unit 104 as a normalized value of the degree of opening $GS_{set}$.

Another exemplary way to implement the illuminance setting method of the invention comprises bringing the density value GX into the desired range by adjusting the voltage to be applied to the halogen lamp 25 which is the source of reading light (this approach is hereunder referred to as method 2).

As is well known, the voltage setting for the halogen lamp 25 can be varied within a specified range without adverse effects on the halogen cycle, color temperature, service life and other factors and by so doing, the quantity of light from the lamp can be adjusted. Method 2 utilizes this feature of the halogen lamp 25. In the aforementioned method 1, the voltage applied to the halogen lamp 25 is set at a fixed value.

Stated more specifically, the initial density value GX is calculated in the manner described above and if it is within the specified range, the voltage being applied to the halogen lamp 25 is fixed at the present value and the corresponding normalized stop value is stored in the aperture control unit 104 as a normalized value of the degree of opening $GS_{set}$.

If the output $GC_{out}$ of the CCD sensor 20 is saturated, the voltage being applied to the halogen lamp 25 is reduced by an appropriate amount and if the density value GX is not within the specified range, the quantity of light from the halogen lamp 25 is adjusted by incrementing or decrementing the voltage being applied to the lamp 25. When the quantity of the light from the halogen lamp 25 has become stable after the lapse of a specified time period, the output $GC_{out}$ of the CCD sensor 20 is measured and the density value GX is calculated by equation (1). This procedure is repeated until the density value GX falls within the specified range; when it comes within the specified range, the voltage being applied to the halogen lamp 25 is fixed and the corresponding normalized stop value is stored in the aperture control unit 104 as a normalized value of the degree of opening $GS_{set}$ (hence, the stored normalized stop value is the aforementioned initial setting value).

If the voltage being applied to the halogen lamp 25 is anticipated to exceed the adjustable range in the process of illuminance setting, the voltage to be applied to the halogen lamp 25 is fixed at the present value and method 1 will take over such that the degree of opening I of the stop 26 is adjusted until the density value GX comes within the specified range, whereupon the corresponding normalized stop value is stored in the aperture control unit 104 as a normalized value of the degree of opening $GS_{set}$.

With the voltage on the halogen lamp 25 having been thus determined to thereby set the normalized value of the degree of opening $GS_{set}$ for the reading of G image, the R filter 28R on the color filter plate 28 is inserted into the optical path L and only method 1 is employed to set a normalized value of the degree of opening $RS_{set}$ for the reading of R image. Finally, B filter 28B on the color filter plate 28 is inserted into the optical path L and, again, only method 1 is employed to set a normalized value of the degree of opening $BS_{set}$ for the reading of B image.

Thusly, the voltage to be applied to the halogen lamp 25 is determined and the three normalized values of the degree of opening $GS_{set}$, $RS_{set}$ and $BS_{set}$ are set, whereby the process of illuminance setting is completed.

It should be noted that the quantity of light from the halogen lamp 25 which is the light source is variable over time due, for example, to deterioration and the deposit of stain, dust particles and the like. Therefore, the illuminance setting according to the invention is preferably performed periodically, for example, each time the input apparatus 10 is started up.

The electronic shutter speed of the CCD sensor 20 to be adopted during the construction of the light source stop table and the illuminance setting in the manner described above is not limited in any particular way; in the embodiment under consideration, the electronic shutter speed for reading a reversal film is employed for each of the three primary colors R, G and B.

In addition, if data of all pixels are used in constructing the light source stop table or in illumination setting, the output from the CCD sensor 20 is affected by shading and other factors and fails to produce the correct value. To deal with this situation, the pixels in the central area of the CCD sensor 20 are selectively used (in the illustrated case, the sensor has 1,380×920 pixels, of which 32×8 pixels in the central area may be selected) and its arithmetic mean is preferably taken.

Further in addition, the imaging magnification of the zoom lens portion 96 of the lens unit 92 is preferably set at the value that is employed for reading the image on a film of a size that is primarily intended to be read by the input apparatus 10 (normally a 135 size).

With the thus set values of normalized degree of opening $GS_{set}$, $RS_{set}$ and $BS_{set}$ being used as references, the input apparatus 10 employs the aforementioned light source stop tables to determine the associated values of the degree of opening of the stop 26 and performs prescanning and main scanning operations.

As already mentioned, it is preferred from an S/N ratio viewpoint that image reading with the CCD sensor 20 is performed in such a way that the sensor output will be saturated at a minimal density point where the quantity of light transmission is either at or near maximum. In practice, however, the film has a base density and if a measurement is performed with the film inserted into the optical path L, the quantity of light transmission (the output of the CCD sensor 20) is sure to decrease. Therefore, prescanning is preferably performed with the quantity of light being increased by an mount corresponding to the base density of the film, namely, with the stop 26 being accordingly opened.

To this end, the input apparatus 10 performs prescanning with the base density associated normalized stop values ($GS_F$, $RS_F$ and $BS_F$) being subtracted from the respective normalized values of the degree of opening $GS_{set}$, $RS_{set}$ and $BS_{set}$ such that the quantity of light is increased by an amount that corresponds to the base density of the film. In addition, a reasonable allowance $S\alpha$ need be subtracted from the base density in order to prevent the output of the image sensor from becoming saturated.

Stated more specifically, the normalized values of the degree of opening for prescanning ($GS_{ps}$, $RS_{ps}$ and $BS_{ps}$) are set in the input apparatus by the following equations:

$$GS_{ps}=GS_{set}-(GS_F-S\alpha)$$

$$RS_{ps}=RS_{set}-(RS_F-S\alpha)$$

$$BS_{ps}=BS_{set}-(BS_F-S\alpha)$$

The base density of the film can be determined empirically. In this connection, it should be mentioned that in order to prevent the output of the CCD sensor 20 from becoming saturated during prescanning, the base density of the film which is to be used as a reference is preferably the lowest of the values to be employed. Exemplary values of the base density are listed below.

| Base Density (D) of Film | | | |
|---|---|---|---|
| | R | G | B |
| Negative film | 0.313 | 0.195 | 0.656 |
| Reversal film | 0.04 | 0.04 | 0.04 |

Upon multiplication by a factor of 128, the density D can be converted to a normalized value of the degree of opening that corresponds to the base density of the film. The allowance $S\alpha$ is not limited to any particular value but in terms of density D, $S\alpha$ is preferably within the range of about 0.01–0.03 in consideration of certain factors such as the scattering in the development of films.

Alternatively, the base density is preliminary determined for each type of the films to be processed, then a specific film type is identified by an appropriate method such as reading the DX bar code with the image plane detecting sensor 54 on the film carrier 22 such that the amount of adjustment of the normalized stop value (the degree of opening) is set in accordance with the base density of that specific film type.

In the illustrated example of the input apparatus 10, the aperture control unit 104 in the prescanning process determines the normalized stop values for prescanning in the manner described above, then determines the values of the degree of opening of the stop 26 on the basis of the thus determined normalized stop values and with the aid of the light source stop table, and adjusts these values of the degree of opening by driving the motor 27.

Having the above-described basic structural design, the input apparatus 10 will operate in the following manner.

When the main power to the input apparatus 10 is turned on to start it, the aperture control unit 10 first performs illuminance setting by the procedure already described above but which is briefly reiterated below.

The halogen lamp 25 is lit with a specified setting of voltage being applied; then, the saturated output $C_{ref}$ of the CCD sensor 20 is set as a target value and the degree of opening of the stop 26 is set at an initial value; when the quantity of light from the halogen lamp 25 has become stable, the G filter 28G is inserted into the optical path L and the output ($GC_{out}$) of the sensor 20 is measured to calculate the density value GX.

Suppose here that the normalized degree of opening $GS_{set}$ for the reading of a G image is set by the already described method 2. If the density value GX is not within the specified range, the voltage being applied to the halogen lamp 25 and, hence, the quantity of light it issues is adjusted; when the quantity of light from the halogen lamp 25 has become stable, the density value GX is calculated. This procedure is repeated until the density value GX comes into the specified range, whereupon the voltage being applied to the halogen lamp 25 is fixed and the corresponding normalized stop value is stored in the aperture control unit 104 as the normalized degree of opening $GS_{set}$. If the voltage adjustment fails to bring the density value GX into the specified range, method 1 is continuously employed to adjust the degree of opening of the stop 26 for setting the normalized degree of opening $GS_{set}$ as described hereinabove.

In the next step, the R filter 28R is inserted into the optical path L and, as described hereinabove, method 1 is employed to set the normalized values of the degree of opening $RS_{set}$ for the reading of an R image by repeating the calculation of GX and the adjustment of the degree of opening of stop 26, and the thus set normalized values of the degree of opening $RS_{set}$ is stored in the aperture control unit 104. Similarly, the normalized values of the degree of opening $RS_{set}$ for the reading of a B image is set and stored in the aperture control unit 104. With the voltage to the halogen lamp 25 and the normalized values of the degree of opening for the three colors, $GS_{set}$, $RS_{set}$ and $BS_{set}$ having been thusly set, illuminance setting according to the present invention is completed.

On the other hand, the operator mounts a suitable carrier on the carrier base 16 as shown in FIG. 4, depending on whether the original to be read is strip A or slide B. If the strip A is the original to be read, the film carrier 22 is mounted in a specified position on the carrier base 16 as shown FIG. 4a.

Then, the compressing member 60 of the film compressing unit 52 is pivoted upward and the strip A is loaded on the film carrier 22 in such a way that the first image recorded on the strip A is located in the reading position Z. A command is then entered to start image reading.

When a command for image reading is delivered, the first image is, as required, subjected to automatic focusing. Then, prescanning and main scanning start.

When prescanning starts, the G filter 28G is inserted into the optical path L. The aperture control unit 104 determines normalized stop values $GS_{ps}$ for prescanning, in accordance with the normalized values of the degree of opening $GS_{set}$ previously set, the normalized values $GS_F$ associated with the film base densities, and the normalized values $S\alpha$ for allowance, then determines the values of the degree of opening I on the basis of the normalized stop values $GS_{ps}$, with the aid of the light source stop table, and adjusts the stop 26 by driving the motor 27. The reading light whose quantity has been adjusted by the aperture stop 26 and the G filter 28G passes through the strip A and the projecting light bearing the image is processed by the lens unit 92 to form a focused image on the CCD sensor 20; the G image of the original is thus read.

When the reading of the G image ends, the color filter plate 28 rotates and another filter, for example R filter 28R is inserted into the optical path L and the aperture stop 26 is adjusted in accordance with $RS_{ps}$ and the R image is read in a similar way. Further, B image is similarly read to complete the prescanning step.

Prescanning image signals are read by the CCD sensor 20 and successively outputted to the image processing unit 100, where the signals are subjected to specified processing jobs such as A/D conversion and logarithmic transformation to obtain an image information. Then, the construction of the density histograms and the setting of the image processing conditions are performed. The image obtained is shown in the display 106.

In addition, the aperture control unit 104 determines successively normalized stop values for G, R and B images in the main scanning, on the basis of the density histograms constructed in the image processing unit 100, for example in accordance with the minimum density.

When the reading of the B image ends in the prescanning, the G filter 28G is again inserted into the optical path L, which is followed by the G image reading in the main scanning. The aperture control unit 104 drives the motor 27, and adjusts the values of the degree of opening of the stop 26 using the light source stop table, on the basis of the normalized stop values of the G image reading in the main scanning previously determined. In the same way as in the prescanning, the light whose quantity has been adjusted by the G filter 28G and the aperture stop 26 passes through the strip A and the projecting light is processed by the lens unit 92 to form a focused image on the CCD sensor 20; the G image of the original is read and then sent to the image processing unit 100. In subsequent steps, the R and B images are read in a similar manner and sent to the image processing unit 100.

Main scanning image signals read by the CCD sensor 20 are outputted to the image processing unit 100, where the signals are subjected to specified processing jobs such as A/D conversion, darkness correction and logarithmic transformation to obtain an image information. Thereafter, the signals are subjected to the color/density correction in accordance with the processing conditions determined in the prescanning to obtain an image information to be outputted, which is delivered to the image recording apparatus P.

When the image reading of the first image ends in this way, a signal to inform of this state is delivered from the control section 21 to the film carrier 22, whereupon the compressing member 60 pivots upward to disengage the strip A. Subsequently, the transport means 50 is activated to transport the strip A in the direction of arrow x until it stops in accordance with the detection result obtained by the image plane detecting sensor 54. Thereafter, the next image is transported to the reading position Z.

Subsequently, the compressing member 60 pivots downward to fix the strip A such that prescanning and main scanning are successively performed.

While the illuminance setting method of the present invention has been described above in detail, the invention is by no means limited to the case described hereinabove and it goes without saying that various design modifications and improvements can be made without departing from the spirit and scope of the invention.

As described in detail on the foregoing pages, according to the illuminance setting method of the invention, the setting of the illuminance for setting the basic quantity of image reading light in the image reading apparatus such as the reading apparatus of the digital photoprinter used to read photoelectrically original images can be accomplished easily and with high efficiency.

What is claimed is:

1. A method for use with an image inputting apparatus to set illuminance of reading light emitted from a source and which has been adjusted in quantity by means of a light source stop, said reading light being allowed to be incident on an original to produce light that is either projected onto or reflected from said original, with the thus projected or reflected light being read with an image sensor photoelectrically, wherein measurement with the image sensor is performed with said light source stop being adjusted to a specified initial value of degree of opening in the absence of original in an optical path; and if an output from the image sensor is not within a specified range, either adjustment of the quantity of the light from the source or readjustment of said light source stop using a light source stop table which represents the relationship between the degree of opening of said light source stop and the output of the image sensor or both the adjustment of the quantity of the light from the source and the readjustment of said light source stop are performed and another measurement with the image sensor is performed in the absence of original in the optical path and these steps are repeated until the output from the image sensor comes to fall within the specified range; and if said output falls within the specified range, the corresponding quantity of the light from the source and the corresponding degree of opening of the light source stop are set as values representing the reference state of the light source for the image reading mode.

2. An illuminance setting method according to claim 1, wherein said light source stop table represents the relationship between the degree of opening of said light source stop and a normalized density value and has been constructed by investigating the relationship between the degree of opening of said light source stop and the output of the image sensor and normalizing to density the output of the image sensor at each value of the degree of opening as referenced to the output of the image sensor at a given value of the degree of opening and wherein a density value X is determined from the output of the image sensor in the absence of original in said optical path by the following equation (1) and the thus determined density value X is used as a criterion for determining whether or not said output has come to fall within a specified range:

$$X = -\log(C_{out}/C_{ref}) \qquad (1)$$

where $C_{out}$ is the output of the image sensor and $C_{ref}$ is a target output as set in view of the saturated output of the image sensor.

3. An illuminance setting method according to claim 1 or 2, wherein the image reading is a color image reading that is performed with the image on the original being separated into three primary colors and wherein said reference state is set for each of the images of the three primary colors to be read such that regarding the second and third colors for which the reference state is to be set, the quantity of the light from the source is fixed and only the readjustment of the light source stop using said light source stop table is performed to set the reference state.

* * * * *